United States Patent
O'Toole

(10) Patent No.: US 6,336,791 B1
(45) Date of Patent: Jan. 8, 2002

(54) DEVICE AND METHOD EMPLOYING A TURBINE FOR CONTRIBUTING THRUST TO A PROPELLER ON A SPINNER

(76) Inventor: Murray J. O'Toole, 2408 Via La Selva, Palos Verdes Estates, CA (US) 90274

( * ) Notice: Subject to any disclaimer, the term of this patent is extended or adjusted under 35 U.S.C. 154(b) by 0 days.

(21) Appl. No.: 09/720,419

(22) PCT Filed: Jun. 23, 1999

(86) PCT No.: PCT/US99/14184

§ 371 Date: May 24, 2001

§ 102(e) Date: May 24, 2001

(87) PCT Pub. No.: WO99/67507

PCT Pub. Date: Dec. 29, 1999

Related U.S. Application Data

(60) Provisional application No. 60/090,741, filed on Jun. 25, 1998.

(51) Int. Cl.[7] .............................................. B64C 11/00
(52) U.S. Cl. ........................... 416/175; 416/1; 416/234; 416/245 R
(58) Field of Search ........................... 416/1, 175, 203, 416/201 A, 200 R, 198 R, 245 R, 234

(56) References Cited

U.S. PATENT DOCUMENTS

| | | | | |
|---|---|---|---|---|
| 1,420,313 A | | 6/1922 | Hall | 416/234 |
| 1,519,102 A | | 12/1924 | Assala | 416/175 |
| 1,592,031 A | | 7/1926 | Lipari | 416/234 |
| 1,706,457 A | | 3/1929 | Moser | 416/245 R |
| 1,824,667 A | | 9/1931 | Grumpelt | 416/245 R |
| 1,907,454 A | | 5/1933 | Squires | 416/175 |
| 1,946,571 A | | 2/1934 | Briner | 416/175 |
| 1,973,326 A | | 9/1934 | Perry | 416/175 |
| 2,058,122 A | | 10/1936 | Assala | 416/234 |
| 2,260,786 A | | 10/1941 | Muhlenbruck | 416/201 A |
| 2,378,125 A | * | 6/1945 | Bowman | 416/175 |
| 2,442,441 A | | 6/1948 | Shellberg | 416/175 |
| 2,472,357 A | | 6/1949 | Wolf | 416/175 |
| 2,913,055 A | * | 11/1959 | Quick | 416/234 |

* cited by examiner

*Primary Examiner*—Edward K. Look
*Assistant Examiner*—Richard Woo
(74) *Attorney, Agent, or Firm*—Miles & Stockbridge P.C.

(57) ABSTRACT

Turbine is added to the spinner of a propeller to provide a contribution to propulsive thrust of the propeller. The turbine comprises a group of turbine modules, which are mounted on the periphery of the spinner between root portions of the propeller blades. Each module includes a curved row of angulated turbine vanes held between a curved base plate and a curved outer plate.

18 Claims, 6 Drawing Sheets

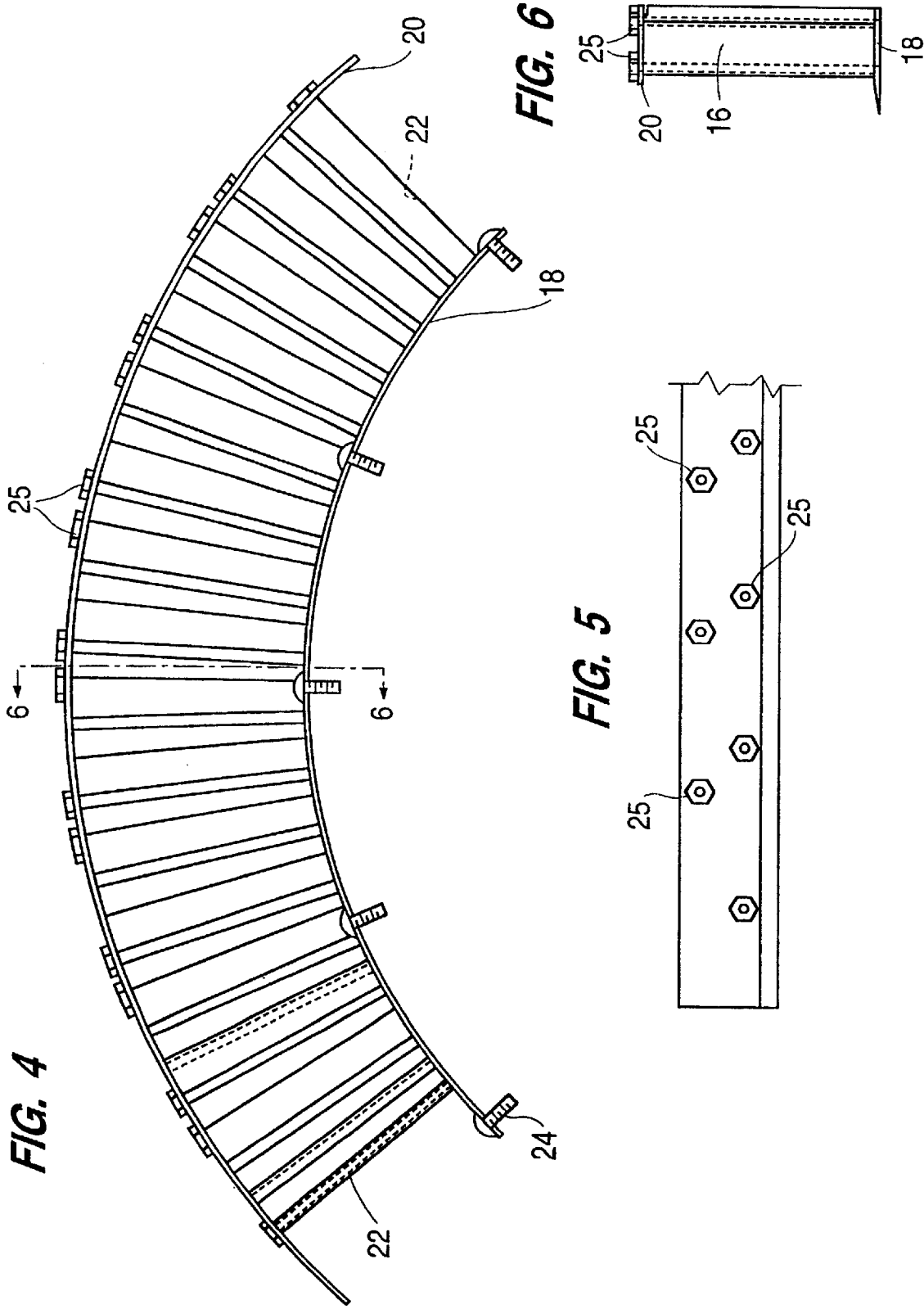

DEVICE AND METHOD EMPLOYING A TURBINE FOR CONTRIBUTING THRUST TO A PROPELLER ON A SPINNER

CROSS-REFERENCE TO CO-PENDING APPLICATION

This application takes the benefit of provisional application No. 60/090,741 filed Jun. 25, 1998, incorporated herein by reference.

BACKGROUND OF THE INVENTION

This invention is concerned with enhancing the performance of a propeller on a spinner, and is more particularly concerned with a device and method employing a turbine for providing a contribution to propulsive thrust of a propeller.

It has previously been proposed to improve the propulsive thrust of an aircraft propeller, e.g., by adding additional propeller blades, by modifying a propeller spinner to provide ridges or grooves acting as air screws, by providing a hollow propeller hub with vanes, or by providing blades or vanes on a propeller hub that are intended to sling air at right angles to the vehicle velocity vector, supposedly to increase the mass of air for the propeller to work on. For various reasons, including, e.g., increased turbulence and drag, and increased complexity and cost, the prior art proposals have been deficient. The present invention avoids the deficiencies of the prior art and enhances the performance of a propeller on a spinner in a manner that is simple and cost effective.

BRIEF DESCRIPTION OF THE INVENTION

In broad terms, the invention involves the addition of a turbine to a propeller spinner, such as a conventional aircraft propeller spinner. In a preferred form, the turbine is provided as a group of turbine modules that are mounted on the spinner between root portions of the propeller blades. The modules are made in matched sets of equal weight to preserve the propeller dynamic balance, and do not interfere with normal propeller operation.

BRIEF DESCRIPTION OF THE DRAWINGS

The invention will be further described in conjunction with the accompanying drawings, which illustrate preferred (best mode) embodiments of the invention, and wherein:

FIG. 4 is a front elevation view showing portions of a turbine module of the invention;

FIG. 5 is a fragmentary top plan view of the module of FIG. 4;

FIG. 6 is a sectional view taken along lines 6—6 of FIG. 4;

DETAILED DESCRIPTION OF THE INVENTION

Figure 1:
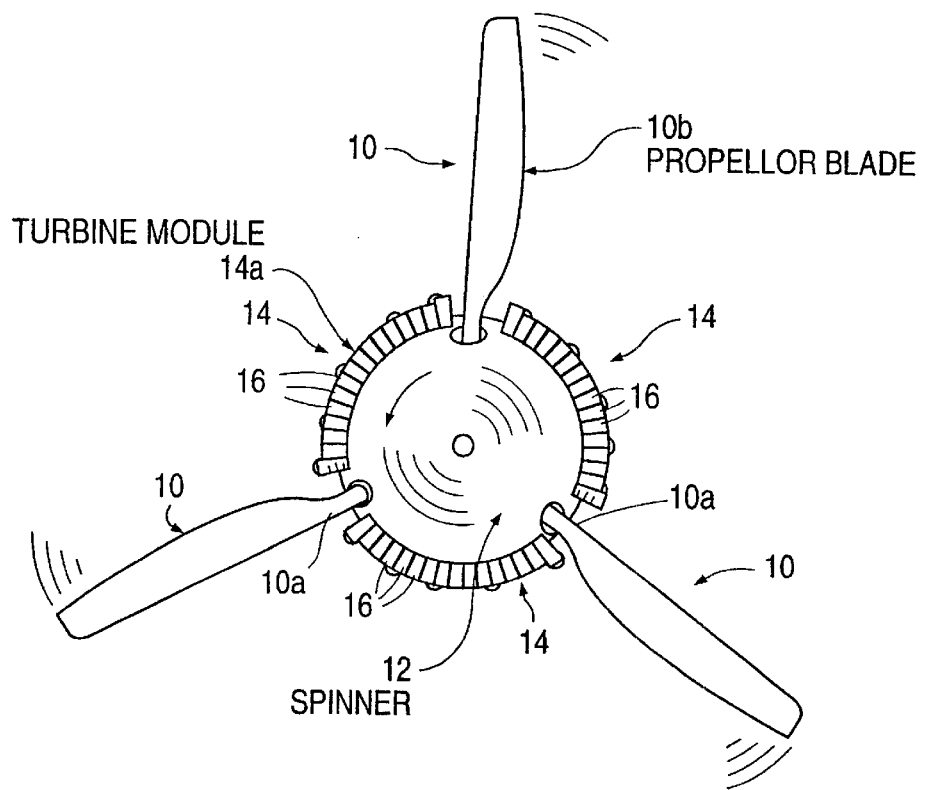
FIG. 1 is a somewhat diagrammatic front elevation view showing a propeller spinner with turbine modules of the invention mounted thereon.

As shown in FIG. 1, in accordance with the invention, a device and method for contributing propulsive thrust to a propeller 10 on a spinner 12 employs a turbine 14 adapted to be mounted on the spinner and having a plurality of turbine vanes 16 disposed along the periphery of the spinner when the turbine is so mounted. The turbine is constructed to convert spinner rotational energy into a contribution to propulsive thrust provided by the propeller. Unlike conventional turbines employed in aircraft engines, the turbine employed in the invention has no stator.

In the embodiment shown in FIG. 1, the turbine comprises a plurality of turbine modules 14a mounted on the periphery of an aircraft propeller spinner between root portions 10a of propeller blades 10b extending from the spinner. In FIG. 1, the spinner has three propeller blades spaced equidistantly around the periphery of the spinner, and there are three turbine modules mounted on the spinner, but the number of propeller blades and the number of turbine modules is not limited to three.

Figure 2:
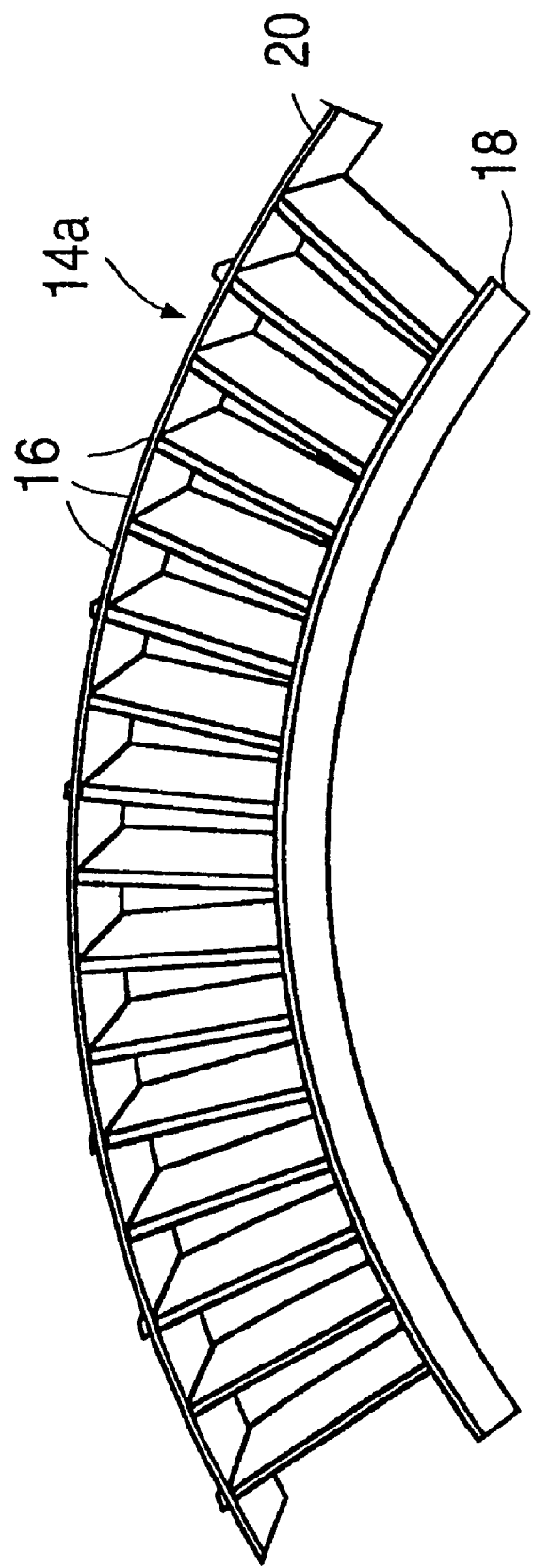
FIG. 2 is a perspective view showing an actual turbine module of the invention.
Figure 3:
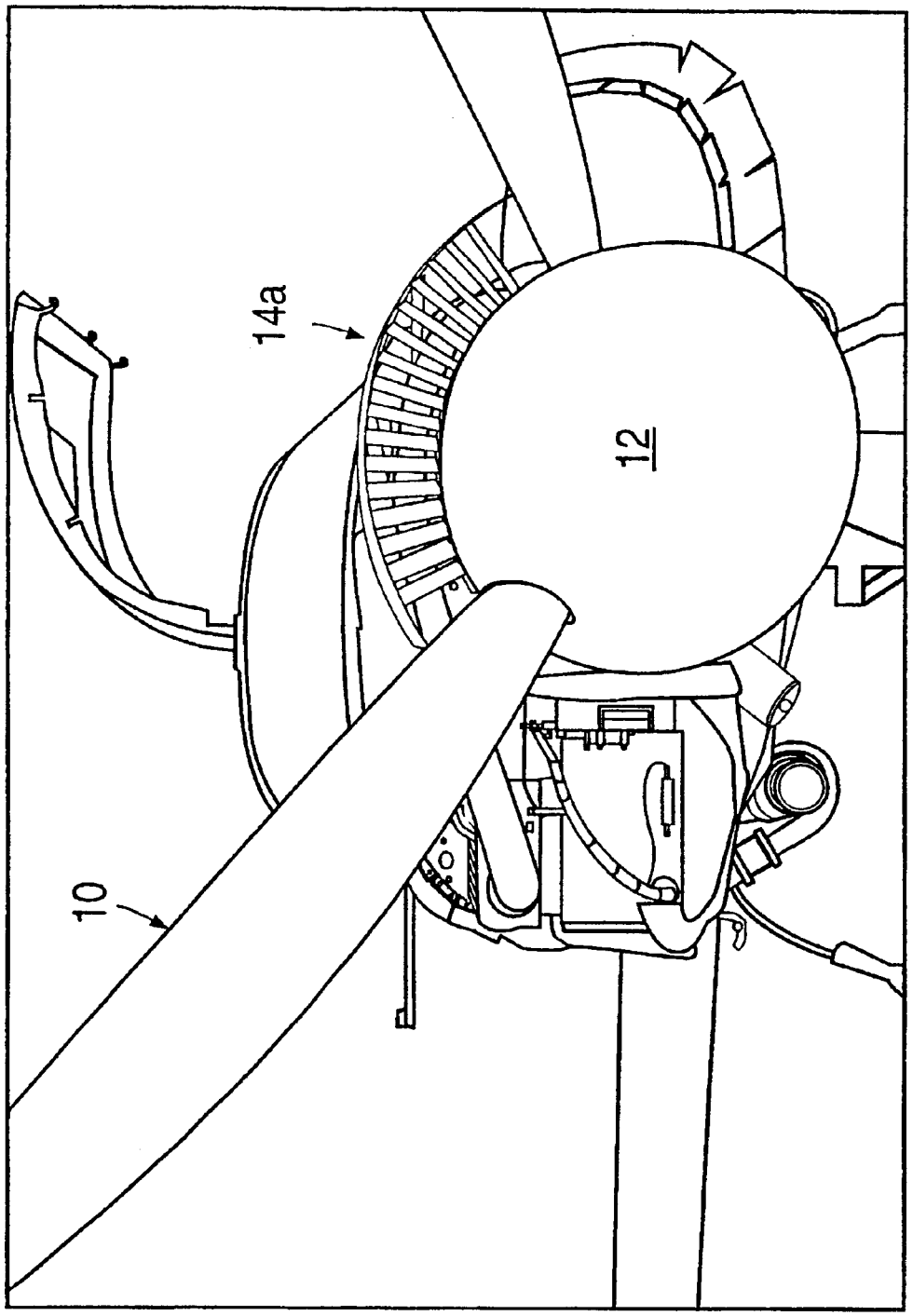
FIG. 3 is a perspective view showing the turbine module of FIG. 2 mounted on a propeller spinner.

As shown in FIGS. 2–4, each turbine module, which may be formed of aluminum, for example, comprises a curved row of turbine vanes 16 held between a curved base plate 18 and a curved outer plate 20. In the form shown, each module contains sixteen vanes. In the present embodiments, the vanes are straight from top to bottom, i.e., untwisted. The number, shape, and dimensions of the vanes can be optimized for a given propeller and spinner combination.

The base plate 18 is curved to the spinner radius and is designed to lie flush with the spinner surface. For example, the base plate may have a radius of 8 inches, a length of 13.75 inches, a width of 1.25 inches, and a thickness of 0.051 inch. The leading edge region of the base plate (e.g., 0.25 inch) is preferably tapered so that the thickness of the base plate is a minimum at the leading edge extremity. The outer plate may, for example, have a radius of 11 inches, and a length of 18.25 inches, a width of 1.0 inch, and a thickness of 0.051 inch.

Successive vanes 16 in each module are equally spaced along the length of the module to define fluid flow channels 21. The leading ends of successive vanes may be spaced apart by about 0.75 inch, for example. The vanes are angulated with respect to the length of the row of vanes. For example, each vane may form an angle of about 60 degrees with respect to the length of the row. The radial vane height may be approximately 3 inches, for example, and is preferably substantially less than the radius of the spinner. The vanes have curved airfoil surfaces that are designed for smooth fluid flow through the channels 21.

Figure 7:
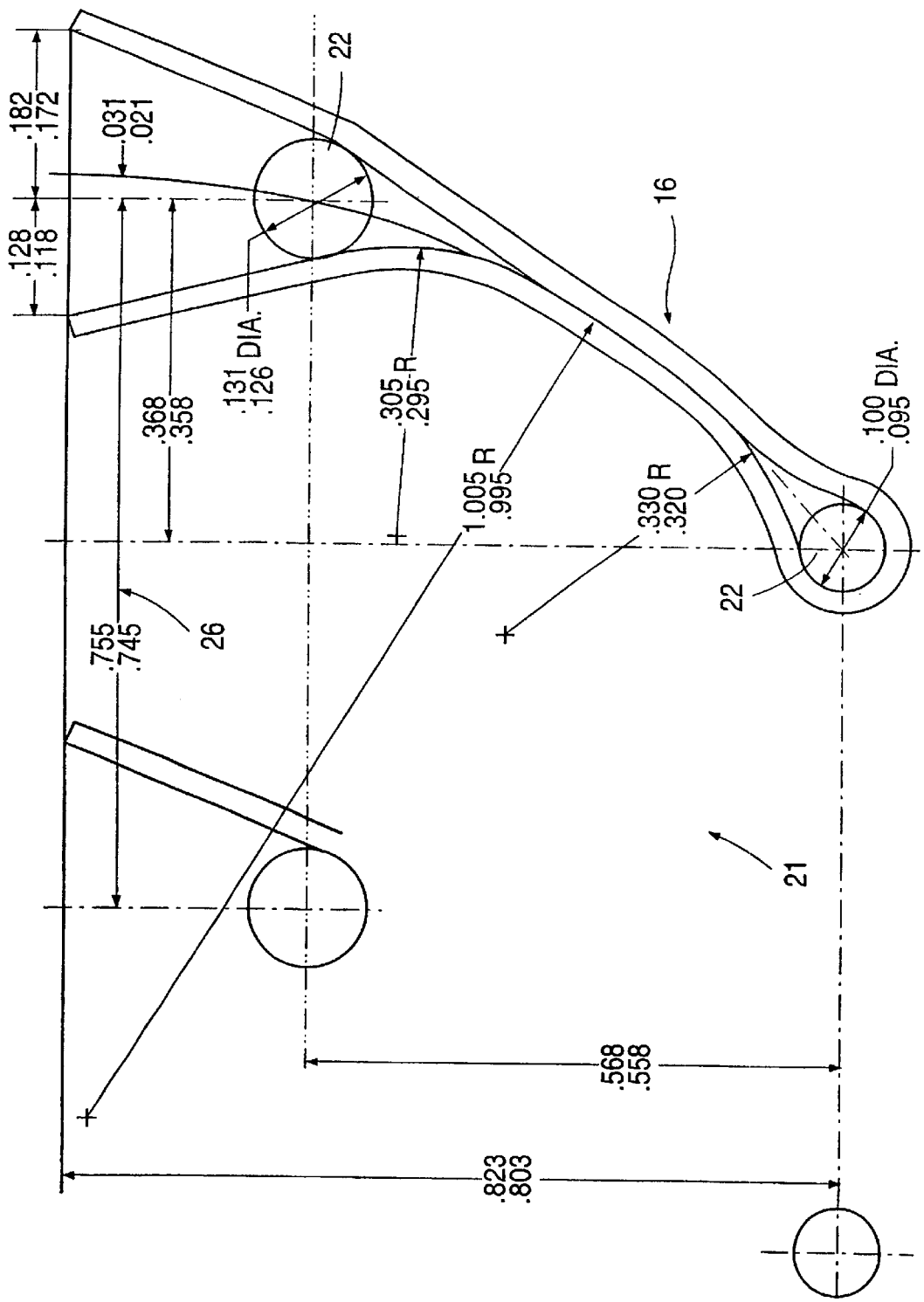
FIG. 7 is a top plan view showing the profile of one type of turbine vanes in accordance with the invention.

As shown in FIG. 7, the vanes 16 may be formed of sheet material approximately 0.025 in. gage and bent to an approximately 30 degree arc around a leading edge rod 22, the trailing edge being split around a trailing edge rod 22 to form a nozzle 26 with an adjacent vane.

Figure 8:
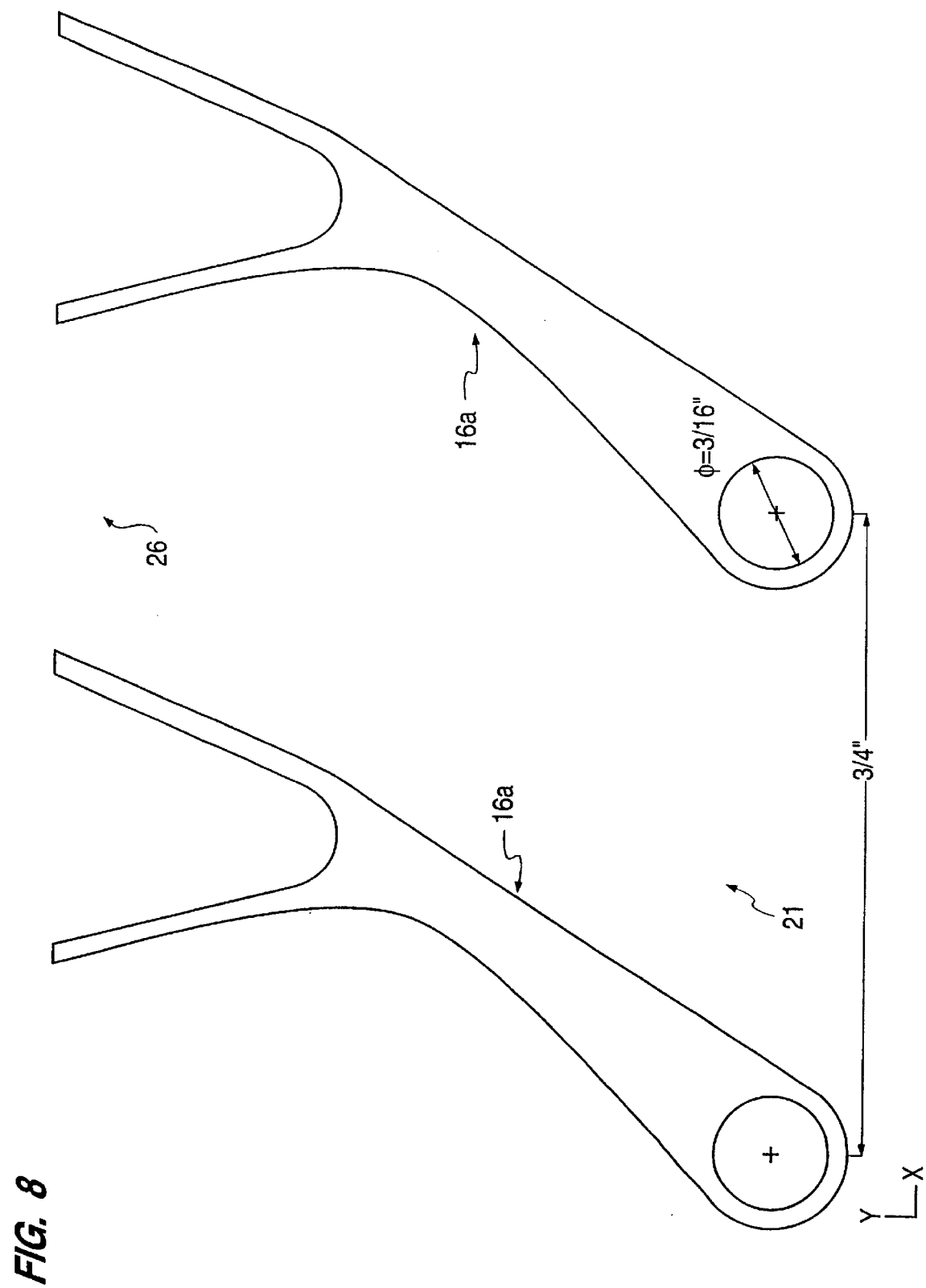
FIG. 8 is a top plan view showing the pro file of another type of turbine vanes in accordance with the invention.

Instead of vanes bent from sheet material as shown in FIG. 7, the vanes may be machined from block material or molded to provide the vane profile shown at 16a in FIG. 8.

The turbine module can be assembled using a series of rods 22, as shown in FIGS. 4–6, and can be attached to the flange of the spinner back plate by screws 24. For simplicity and clarity of illustration, in FIG. 4 an arrangement of rods 22 is shown without the vanes, one of which is shown in FIG. 6. Rods may have heads that are countersunk into holes in the base plate and bonded into the base plate by a suitable adhesive, and/or rods may be staked and bonded into holes in the base plate. At least some of the rods may extend through holes in the outer plate and be threaded to receive nuts 25. Other rods may be inserted into holes in the outer plate and remain flush to the outer plate surface. The outer plate prevents vane tip vortex losses and holds the vanes to the spinner against centrifugal forces.

In an alternative construction, attachment of solid vanes (e.g., FIG. 8) to the base plate and the outer plate can be by means of screws countersunk into the base plate and the outer plate. In still another alternative construction, the entire turbine module can be formed of plastic. Each vane may have upper and lower protrusions that fit within corresponding holes in the base plate and the outer plate.

Figure 9:
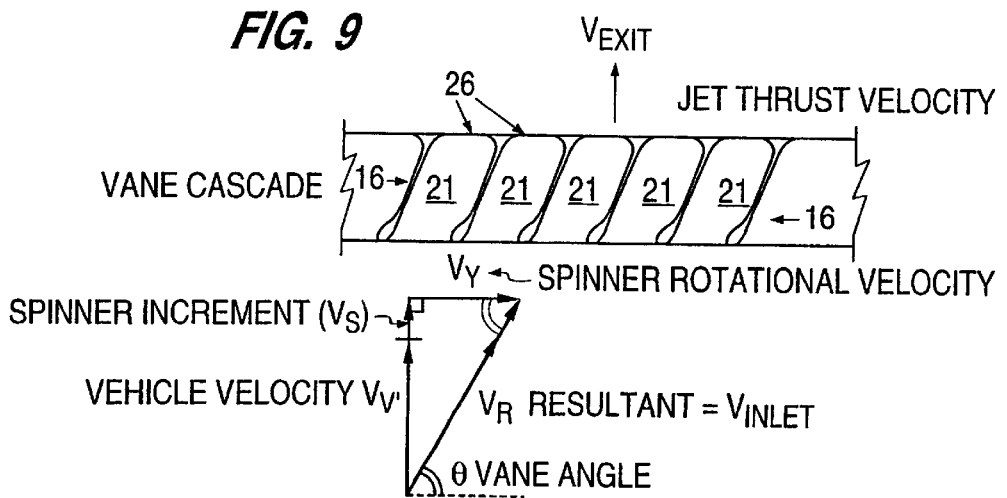
FIG. 9 is an explanatory diagram.

The device of the invention operates on unprocessed air, as a pump, to convert spinner rotational energy into a contribution to propulsive thrust. As shown in FIG. 9, the vanes are aligned to the cruise velocity vector $V_R$ resulting from the vehicle velocity $V_V$ plus a spinner increment $V_S$, and orthogonal spinner rotational velocity $V_Y$. $V_R=V_{inlet}$, which is the inlet velocity of the fluid entering the channels 21 defined between successive vanes. The invention is preferably custom-tailored to an aircraft/engine/propeller combination. Off-design speeds for other flight regimes produce a thrust contribution but with lower efficiency.

By virtue of the nozzles 26 formed by the trailing edges of the vanes, there is an increase in the exit velocity $V_{exit}$ of the fluid exiting from the channels 21 defined between successive vanes, providing numerous jets that add a gross thrust increment.

The invention can be applied to fixed pitch or constant speed aircraft propellers, for example. With a constant speed aircraft propeller, the cruise power settings of the aircraft engine yield a fixed torque. Adding the turbine torque requires that the propeller blades unload by adjusting to a lower pitch to maintain constant RPM. The lower pitch produces less drag, which is equivalent to adding positive thrust. With the invention, a pilot has the option of enjoying an increase in speed, or by throttling back to the handbook cruise speed (specified without the turbine) enjoying a decreased fuel burn and extended range. Summarizing, benefits of the invention include:

1. The ability to absorb more power.
2. Improved engine cooling airflow, where the turbine vanes cross over cooling entrance ducts.
3. Lower propeller noise (lower RPM for the same power with fixed pitch propeller or with flatter pitch of constant speed propeller).
4. Lower fuel flow for the original handbook cruise airspeed.
5. Increased range.
6. Increased cruise speed (slight increase in power for fixed pitch propeller; no increase in power for constant speed propeller).
7. Increased propulsive thrust (decrease of propeller blade drag for constant speed propeller).

The invention is applicable to both pusher-type and puller-type aircraft propellers and may be appropriate for marine use in certain circumstances. Although the invention has been described as a device to be added to an existing spinner, spinners can be designed initially to incorporate the turbine modules of the invention.

While preferred embodiments of the invention have been shown and described, modifications can be made without departing from the principles and spirit of the invention, the scope of which is defined in the following claims.

What is claimed is:

1. A device for contributing propulsive thrust to a propeller on a spinner, comprising a turbine adapted to be mounted on the spinner and having a curved row of turbine vanes disposed along the periphery of the spinner when the turbine is mounted on the spinner, wherein the vanes are disposed between inner and outer curved surfaces and wherein the vanes provide a series of fluid flow channels that are oriented to cause fluid that enters front inlets of the channels to exit from rear outlets of the channels in a direction so that the thrust of the existing fluid adds to the propulsive thrust of the propeller.

2. A device according to claim 1, wherein the vanes are angulated so that the length of each channel between its inlet and outlet is at an acute angle to the length of the curved row.

3. A device according to claim 1, wherein the vanes have curved airfoil surfaces extending between the inlets and outlets of the channels.

4. A device according to claim 1, wherein outlet regions of the channels are shaped to define nozzles that increase the exit velocity of fluid passing through the channels.

5. A device according to claim 1, wherein the turbine is divided into a plurality of separate modules constructed to fit between successive propeller blades extending from the spinner.

6. A device according to claim 5, wherein each module includes a curved base plate adapted to be mounted on the spinner and a curved outer plate, with a plurality of the vanes disposed between the plates.

7. A device according to claim 5, wherein the propeller blades have non-thrust-producing root portions, and the modules are adapted to fit between successive root portions.

8. A device according to claim 5, wherein the radial height of the vanes is substantially less than the radius of the spinner.

9. A method of providing a propulsive thrust contribution to a propeller on a spinner, comprising providing along the periphery of the spinner a turbine that includes a curved row of turbine vanes disposed along the periphery of the spinner between inner and outer curved surfaces, wherein the vanes provide a series of fluid flow channels that are oriented to cause fluid that enters front inlets of the channels to exit from rear outlets of the channels in a direction so that the thrust of the exiting fluid adds to the propulsive thrust of the propeller.

10. A method according to claim 9, wherein the vanes are angulated so that the length of each channel between its inlet and outlet is at an acute angle to the length of the curved row.

11. A method according to claim 10, wherein outlet regions of the channels are shaped to form nozzles that increase the velocity of fluid flowing through the channels.

12. A method according to claim 11, wherein the channels are constructed to provide smooth fluid flow therein.

13. A spinner having a propeller thereon with a plurality of blades, and a turbine mounted on the spinner and having a curved row of turbine vanes disposed along the periphery of the spinner between inner and outer curved surfaces, the turbine being constructed to convert spinner rotational energy into a contribution to propulsive thrust provided by the propeller, wherein the vanes provide a series of fluid flow channels that are oriented to cause fluid that enters front inlets of the channels to exit from rear outlets of the channels in a direction so that the thrust of the exiting fluid adds to the propulsive thrust of the propeller.

14. A spinner according to claim 13, wherein the vanes are angulated so that the length of each channel between its inlet and outlet is at an acute angle to the length of the curved row.

15. A spinner according to claim 13, wherein the vanes have curved airfoil surfaces extending between the inlets and outlets of the channels.

16. A spinner according to claim 13, wherein outlet regions of the channels are shaped to define nozzles that increase the exit velocity of fluid passing through the channels.

17. A spinner according to claim 13, wherein the turbine is divided into a plurality of modules disposed between successive propeller blades extending from the spinner.

18. A spinner according to claim 13, wherein each module includes a curved base plate mounted on the spinner and a curved outer plate, with a plurality of the vanes disposed between the plates.

* * * * *